United States Patent [19]
Stefanec

[11] 3,743,511
[45] July 3, 1973

[54] MEATLESS SAUSAGE

[76] Inventor: Joseph L. Stefanec, 331 East 89th Street, New York, N.Y.

[22] Filed: Feb. 8, 1971

[21] Appl. No.: 113,754

Related U.S. Application Data

[63] Continuation of Ser. No. 677,200, Oct. 23, 1967, abandoned.

[52] U.S. Cl.............................. 99/1, 99/109, 99/166, 99/175, 99/176, 219/384, 264/27, 264/156
[51] Int. Cl........................... A22c 13/00, A23l 1/00
[58] Field of Search ................. 99/14, 17, 199, 208, 99/175, 176, 1, 109, 233, 166, 169; 219/384, 383; 83/16, 170; 264/154, 22, 26, 27, 156

[56] References Cited
UNITED STATES PATENTS

| | | | |
|---|---|---|---|
| 2,129,832 | 9/1938 | Eckrich et al. | 99/176 |
| 2,830,902 | 4/1958 | Anson et al. | 99/14 |
| 2,372,508 | 3/1945 | Meaker | 219/384 |
| 3,160,687 | 12/1964 | Andrews | 219/384 |
| 2,808,421 | 10/1957 | Brokaw | 99/169 |
| 2,608,488 | 8/1952 | Rumsey | 99/176 |

OTHER PUBLICATIONS

Chemicals Used in Food Processing, Nat. Acad. of Sciences, 1965, page 270
Condensed Chemical Dictionary, 7th Ed., 1966, pp. 711, 712, 959

*Primary Examiner*—Morris O. Wolk
*Assistant Examiner*—Stephen B. Davis
*Attorney*—Peter M. Boesen

[57] ABSTRACT

Sausage casing is perforated by means of electric discharge. A non-meat dehydrated filling is inserted in the porous casing the ends of which are closed to contain the filling. The pores of the casing are closed by applying a coating composition consisting of an edible oil and glycerol triacetate to the exterior of the casing. Upon soaking in water, the oil is loosened from around the pores and the water permeates the casing and hydrates the filling.

10 Claims, 4 Drawing Figures

PATENTED JUL 3 1973 3,743,511
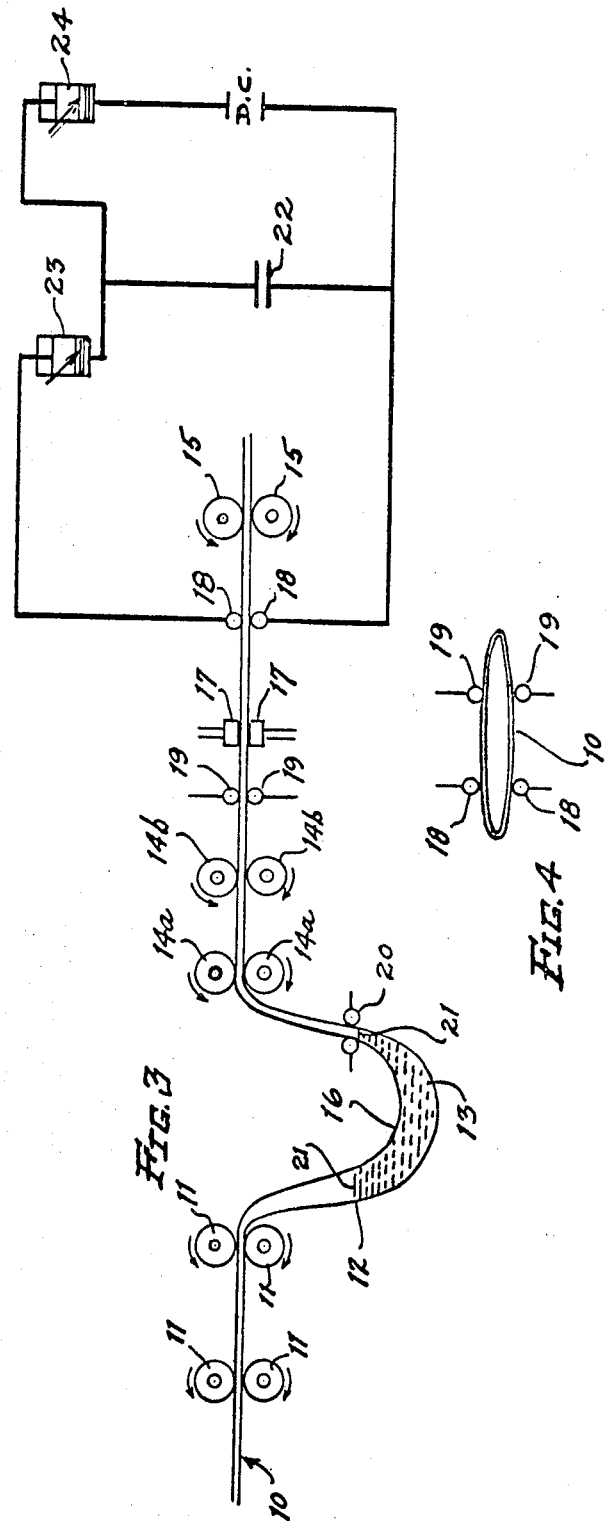

MEATLESS SAUSAGE

This is a continuation of my application Ser. No. 677,200 filed Oct. 23, 1967, now abandoned.

BACKGROUND OF THE INVENTION

1. Field of the invention

The invention relates to meatless encased sausages including uncured as well as cooked and dry sausages.

2. The prior art

The encased meat sausages have been a convenient and desired form of meat preparation for at least 2,000 years and their varieties have been estimated at about 200. The desire for meat sausages is so natural that Roman emperors could not successfully prohibit sausage eating by law.

Unfortunately, for various dietary and other reasons, many persons may not be able to eat meat sausages.

SUMMARY OF THE INVENTION

Disclosed are recipes of meatless compositions with method for preparing porous casings by electric discharge. Porosity of casings is desirable both for soaking sausages having dehydrated ingredients and for venting steam to prevent rupture of the casing when the sausage contents are moist and being roasted. A mixture of glycerol triacetate and oil closes the pores of the casing.

BRIEF DESCRIPTION OF THE DRAWING

FIG. 1 shows a filled out casing;
FIG. 2 shows a porous casing;
FIG. 3 shows an apparatus for increasing the porosity of the casing, and
FIG. 4 shows a detail of the apparatus of FIG. 3.

DESCRIPTION OF THE PREFERRED EMBODIMENTS

In one form of the invention the sausage S may comprise a conventional casing C, either natural or cellulosic, containing non-meat palatable filling ingredients such as a cooked mixture of potato or cereal flour, soy bean or other leguminous or nut meals, cheese, vegetables, vegetable oil, flavoring and spices and condiments, preferably the sausage is covered with a coating of a mixture of glycerol triacetate and edible or harmless oil, such as peanut oil, to prevent the formation of a water film from adhering too closely on the exterior of the casing by condensation upon cooling in air. Such a sausage is then quickly frozen to halt bacterial action and heated by boiling or slow roasting or frying and then served.

In another form of the invention the filling ingredients may be in the cooked or raw dehydrated or dry form and placed in a porous casing over which is applied a mixture of non-toxic or edible oil such as peanut oil and glycerol triacetate to close the pores of the casing. The casing and contents may be soaked in water to fill out the casing by absorption of the water into the dehydrated ingredients. The slight solubility of glycerol triacetate tends to to produce an emulsion of the oil in the water in which the dehydrated sausage is soaked and to loosen the oil from around the pores of the casing so as to permit the water to permeate through the casing.

Porous casings are particularly adapted to the use of dry uncooked ingredients such as soy bean meal, dried egg whites, ground and cracked grains or dry starchy flour, and cracked nut kernels which have long shelf-life. Since the volume of the dried constituents is from about a tenth to a fourth that of the soaked and cooked sausage, package and storage space is materially reduced. The next above mentioned ingredients may be cooked in hot water during the soaking or subsequent thereto. The egg white powder serves not only as a good source of protein but also as a binder for mealy or granular ingredients, consequently it is better to soak the sausage first in lukewarm water to fill out the casing and then boil the sausage to set the ingredients with the egg white serving for cohesion. Somewhat the same effect is obtained by the use of finely divided Cheddar cheese, though the cheese tends to become segregated during soaking. The use of a binder which accomplishes this cohesion or adhesion by heat is of particular benefit in the event the casing should burst during the later stages of cooking.

While the ingredients may be varied widely according to the customs of taste of the trade to be served the following examples are given as typical recipes in parts by volume.

EXAMPLE I 2 parts soya bean meal
1 part potato flour
¼ part dried egg white
all with seasoning of salt, ground pepper, coriander, clove, nutmeg, and sage to taste.

Other recipes and which will enable the meatless sausage to be roasted without prior soaking are

EXAMPLE II 2 parts by weight Cheddar cheese
1 part by weight quick cooking dry oatmeal
1 part by weight peanut butter
⅛ part by weight coriander seed
    condiments to taste, all intimately mixed.

EXAMPLE III 2 parts by weight smoked cheese
1 part by weight cooked soya flour mash
2 parts by weight cooked frijole mash
condiments to taste including liberal amount of hot pepper. This should be kept under refrigeration.

While porous casings are necessary for the hydration of dehydrated contents, the porosity is desirable when the recipe contains a mash as in Example III so that steam may escape without undue danger of bursting the casing during roasting.

When the formula of Example I mixed and put in cellulosic casing of about five-eighths in. in diameter and soaked in warm water, the rate of swelling will of course vary with the porosity of the casing. The heavy conventional cellulosic frankfurter or sausage casing can be made more porous by the provision of a number of small openings or pores 9. Ordinary pin pricks reduce the mechanical strength of the casing, but if the openings are made by burning such as by the light application of a heated small projection the strength is not dangerously impaired. A simpler way by which the casing may be perforated is by electric discharge. In this process the casing is passed between two electrodes connected to a high voltage condenser which may be periodically charged and discharged. In this manner two openings are made in the opposite sides of the casing. It is advisable that the casing be at least slightly damp on the inside at the time of discharge. This renders the material of the case more susceptible to electrical breakdown and sparking to burn small holes through two thicknesses of casing walls and also avoids likelihood of burning or excessive pore size.

A device for carrying out this method is shown in FIG. 3 wherein a run of casing 10 is taken from a supply (not shown) by head feeding rollers 11 to a slack zone 12 where the run hangs as a U portion 13 before passing between pairs of intermediate feeding rollers 14a and 14b running at the same speed or very slightly faster than the head rollers 11 and thence through tail rollers 15. Water or a salt solution 16 is held in the U portion for wetting the inner wall of the casing. Between the rollers 14b and 15, suction boxes 17 act on the upper and lower portion of the almost collapsed casing so as to keep these two portions slightly apart as the casing passes between upper and lower electrodes 18 in contact therewith. Air can be trapped in the casing when the latter is first threaded between the rollers 14b and 15. The function of the trapped air is to initially keep opposite sides of the casing slightly apart lest they accidentally become welded together by the electrodes. After a few pores have been burned through the casing the air remains essentially trapped, but it is possible for the suction boxes to separate the casing sides due to entrance of air through the pores.

Electrode pairs such as 19 may be arranged along the path of the casing, but preferably laterally off from another pair as shown in FIG. 4. One pair 20 of the electrodes may be arranged substantially at the liquid level 21 of the tail end of the U loop 13. This has the advantage of utilizing the liquid 16 as a conductor so as to confine the resulting holes or pores more closely to the location of the electrodes.

Each pair of electrodes may be energized by the discharge of a low capacity condenser 22 controlled by a high voltage switch such as an Ignitron 23. The condenser is periodically charged from a D.C. source under the control of a similar switch 24. The capacity of the condenser should be low enough so that no excessive number of oscillations occur as this not only causes large holes to be burned through the casing, but wastes energy in the form of heat.

In the operation of the device, for a given rate of condenser discharge, the run of casing is put through at a rate which will enable a sufficient number of holes or pores to be burned depending on the rate of absorption by the sausage ingredients and the extent of heating of the casing by the discharge. The speed of the rollers 14a, 14b and 15 may remain constant after heat effects are established and the longitudinal hole spacing is determined. The head rollers 11 are run at a rate that will then allow the liquid level 21 to remain constant at the electrodes 20. If electrodes 20 are not used the speed of the head rollers need not be so carefully controlled of course.

The porous casing is then filled to the degree desired with a receipe composition and the ends closed in a conventional manner. The sausage is then dipped in a mixture of 10 parts by volume of peanut oil and 1 to 3 parts by volume of glycerol triacetate to close the pores of the casing. At room temperature this closure is effective for pores ranging from about 0.03 to 0.20 mm in diameter. The vinegar taste or odor of the glycerol triacetate is partially absorbed by the ingredients of the sausage to enhance taste. The coated sausages are then prepared for serving or freezing as herein above indicated according to their contents.

What is claimed is:

1. A method for preparing meatless sausages for consumption comprising inserting a raw, palatable non-meat dehydrated filling into a porous sausage casing, closing the ends of the casing to contain the filling therein, applying a coating of a mixture consisting essentially of edible oil and glycerol triacetate to the exterior of the casing, and soaking the sausage in water, whereby upon soaking the sausage in water, the slight solubility of the glycerol triacetate produces an emulsion of the oil in water thereby loosening the oil from around the pores of the casing so that water can permeate the casing through the pores.

2. A method according to claim 1, wherein the casing is made porous by passing a nearly collapsed length of the casing between electrodes periodically charged to a sufficient potential to discharge through two thicknesses of the casing to form pores therethrough.

3. A method according to claim 2 which further comprises applying water to the wall of the casing prior to passing the casing between the electrodes.

4. A method according to claim 3, which further comprises feeding the casing toward the electrodes and through a U-shaped depending zone having water therein, the rate of passage through the zone being controlled so that the level of the water in the casing, as portions thereof leave the water, is substantially the same in space, and applying high voltage to the exterior of the casing at said level of substantially diametrically opposite points to form pores in the casing.

5. A method for preparing meatless sausages for consumption comprising passing a nearly collapsed length of the sausage casing between electrodes periodically charged to a sufficient potential to discharge through two thicknesses of the casing to form pores therethrough, applying suction to the exterior opposite sides of the nearly collapsed casing to prevent contact therebetween and to prevent welding of the sides to each other during the discharge, inserting a palatable non-meat filling into said casing, closing the ends of the casing to contain the palatable non-meat filling therein and applying a coating of a mixture consisting of edible oil and glycerol triacetate to the exterior of the casing.

6. A meatless sausage which comprises a porous casing, a raw, palatable non-meat dehydrated filling disposed therein, a coating consisting essentially of a mixture of glycerol triacetate and an edible oil applied over the casing surface to close the pores, whereby upon soaking the sausage in water, the slight solubility of the glycerol triacetate produces an emulsion of the oil in water thereby loosening the oil from around the pores of the casing so that water can permeate the casing through the pores.

7. A meatless sausage according to claim 6 wherein the edible oil and glycerol triacetate are mixed in a ratio of 10 parts by volume of edible oil to 1 to 3 parts by volume glycerol triacetate.

8. A meatless sausage according to claim 6 wherein the filling has been cooked before being disposed within the casing.

9. A meatless sausage according to claim 6 wherein the filling is in dry form.

10. A meatless sausage according to claim 6 wherein the oil is peanut oil.

* * * * *